United States Patent
Mihara et al.

(10) Patent No.: US 10,800,376 B2
(45) Date of Patent: Oct. 13, 2020

(54) BELT RETRACTOR FOR A SAFETY BELT DEVICE

(71) Applicants: JOYSON SAFETY SYSTEMS GERMANY GMBH, Aschaffenburg (DE); JOYSON SAFETY SYSTEMS JAPAN K.K., Shinagawa-ku, Tokyo (JP)

(72) Inventors: Atsushi Mihara, Shiga (JP); Lars Gonnermann, Mömlingen (DE); Thomas Feiertag, Ehingen (DE); Hans-Jürgen Divo, Langenau (DE); Paul Sprongl, Ulm (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 27 days.

(21) Appl. No.: 16/314,349

(22) PCT Filed: Jun. 14, 2017

(86) PCT No.: PCT/DE2017/200053
§ 371 (c)(1),
(2) Date: Dec. 28, 2018

(87) PCT Pub. No.: WO2018/001421
PCT Pub. Date: Jan. 4, 2018

(65) Prior Publication Data
US 2019/0322241 A1    Oct. 24, 2019

(30) Foreign Application Priority Data

Jun. 30, 2016 (DE) .................. 10 2016 211 886

(51) Int. Cl.
*B60R 22/46* (2006.01)

(52) U.S. Cl.
CPC .... *B60R 22/4628* (2013.01); *B60R 2022/468* (2013.01); *B60R 2022/469* (2013.01);
(Continued)

(58) Field of Classification Search
CPC .......... B60R 22/4628; B60R 2022/468; B60R 2022/469; B60R 2022/4642; B60R 2022/4666
See application file for complete search history.

(56) References Cited

U.S. PATENT DOCUMENTS 6,910,653 B2    6/2005 Tanji
9,796,356 B2    10/2017 Hertäg et al.
(Continued)

FOREIGN PATENT DOCUMENTS

DE    10 2004 027 135 A1    12/2005
DE    10 2006 036 554 A1    2/2008
(Continued)

OTHER PUBLICATIONS

International Search Report dated Oct. 26, 2017 in International Application No. PCT/DE2017/200053; filed Jun. 14, 2017.

*Primary Examiner* — Sang K Kim
(74) *Attorney, Agent, or Firm* — Gordon Rees Scully Mansukhani, LLP

(57) ABSTRACT

The invention relates, inter alia, to a belt retractor (10) for a safety belt device, with a belt reel (20) for winding up and unwinding the safety belt, a pretensioner drive (40) and a pyrotechnic tensioner drive (30), wherein the pretensioner drive (40) has a force-flux-control element (100) which, in a deactivation position, interrupts the force flux between pretensioner drive (40) and belt reel (20). It is provided that the pyrotechnic tensioner drive (30) has one or more drive elements (33) which, after activation of the pyrotechnic tensioner drive (30), is or are set into motion, and, after (Continued)

Figure 1:
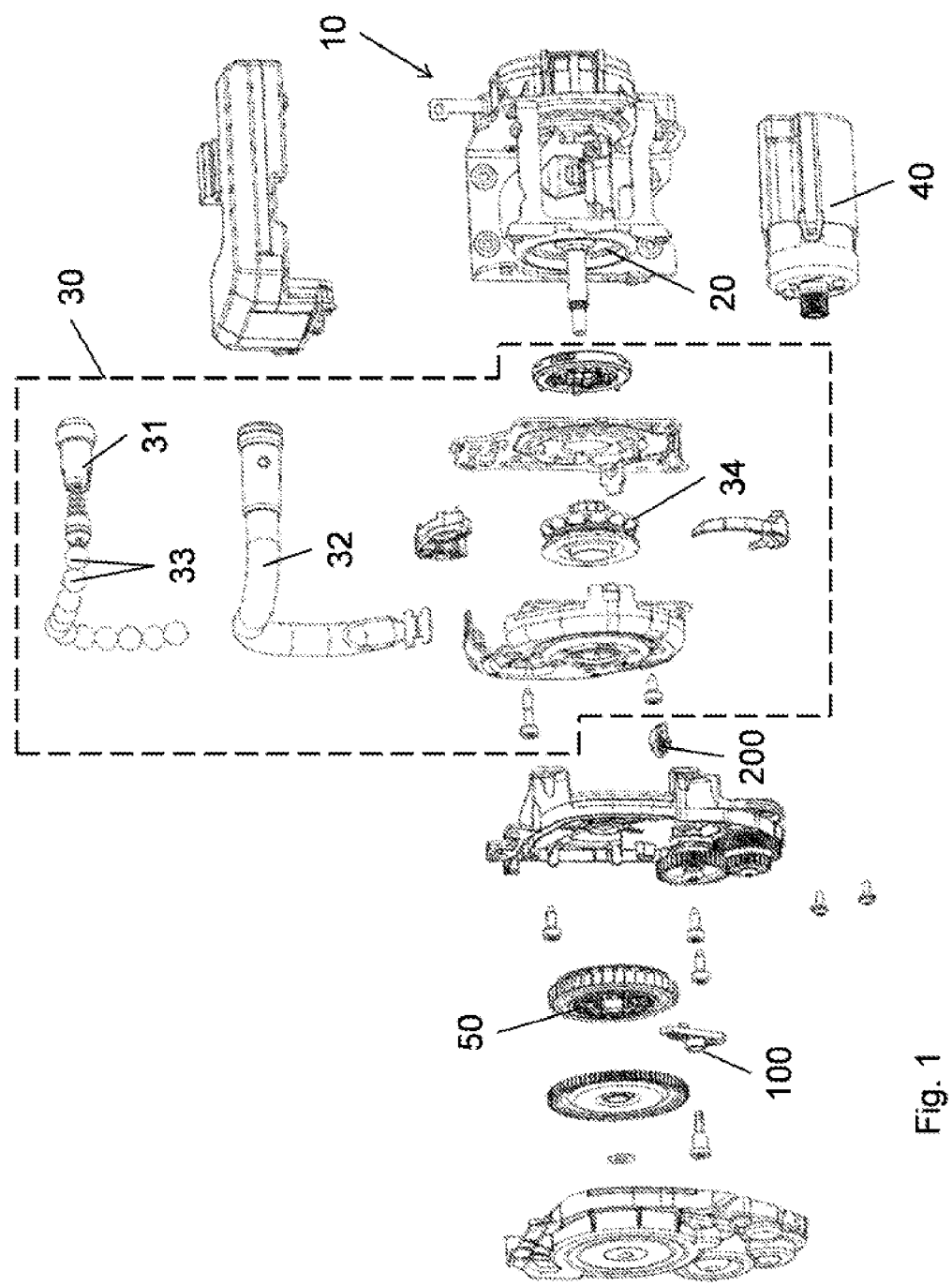

activation of the pyrotechnic tensioner drive (30), the force-flux-control element (100) is adjusted directly or indirectly by the drive element (33) or—in the case of a plurality of drive elements (33)—by at least one of the drive elements (33) of the pyrotechnic tensioner drive (30) into the deactivation position.

13 Claims, 7 Drawing Sheets

(52) U.S. Cl.
CPC ............... *B60R 2022/4642* (2013.01); *B60R 2022/4666* (2013.01)

(56) References Cited

U.S. PATENT DOCUMENTS

| | | | |
|---|---|---|---|
| 2002/0096591 A1* | 7/2002 | Tanji | ............... B60R 22/46 242/390.8 |
| 2005/0284976 A1 | 12/2005 | Holbein et al. | |
| 2008/0210803 A1* | 9/2008 | Prokscha | ............... B60R 22/46 242/384 |
| 2014/0319262 A1 | 10/2014 | Maemura et al. | |

FOREIGN PATENT DOCUMENTS

| | | |
|---|---|---|
| DE | 10 2012 019 004 A1 | 3/2014 |
| EP | 1 886 883 A1 | 2/2008 |
| EP | 2 476 591 A1 | 7/2012 |

* cited by examiner

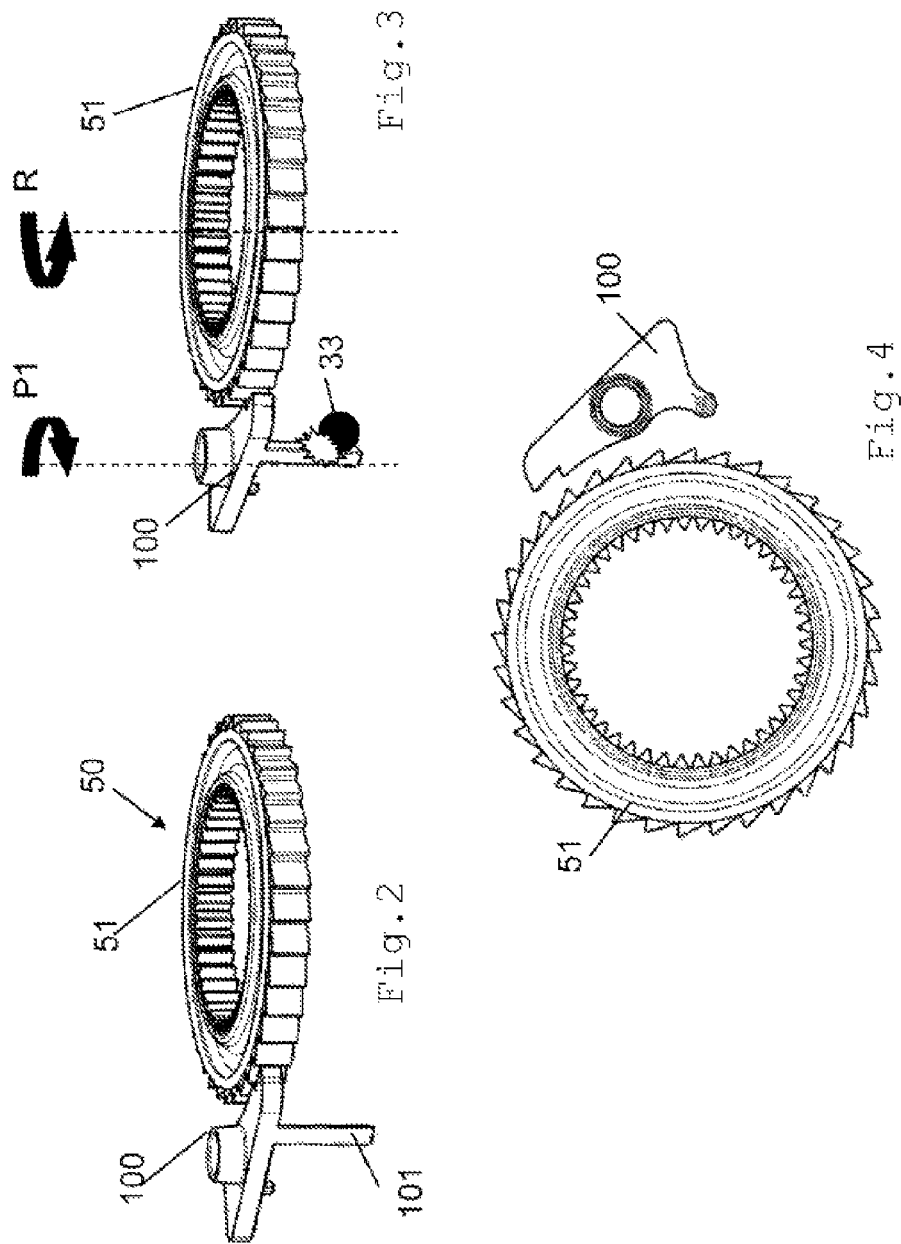

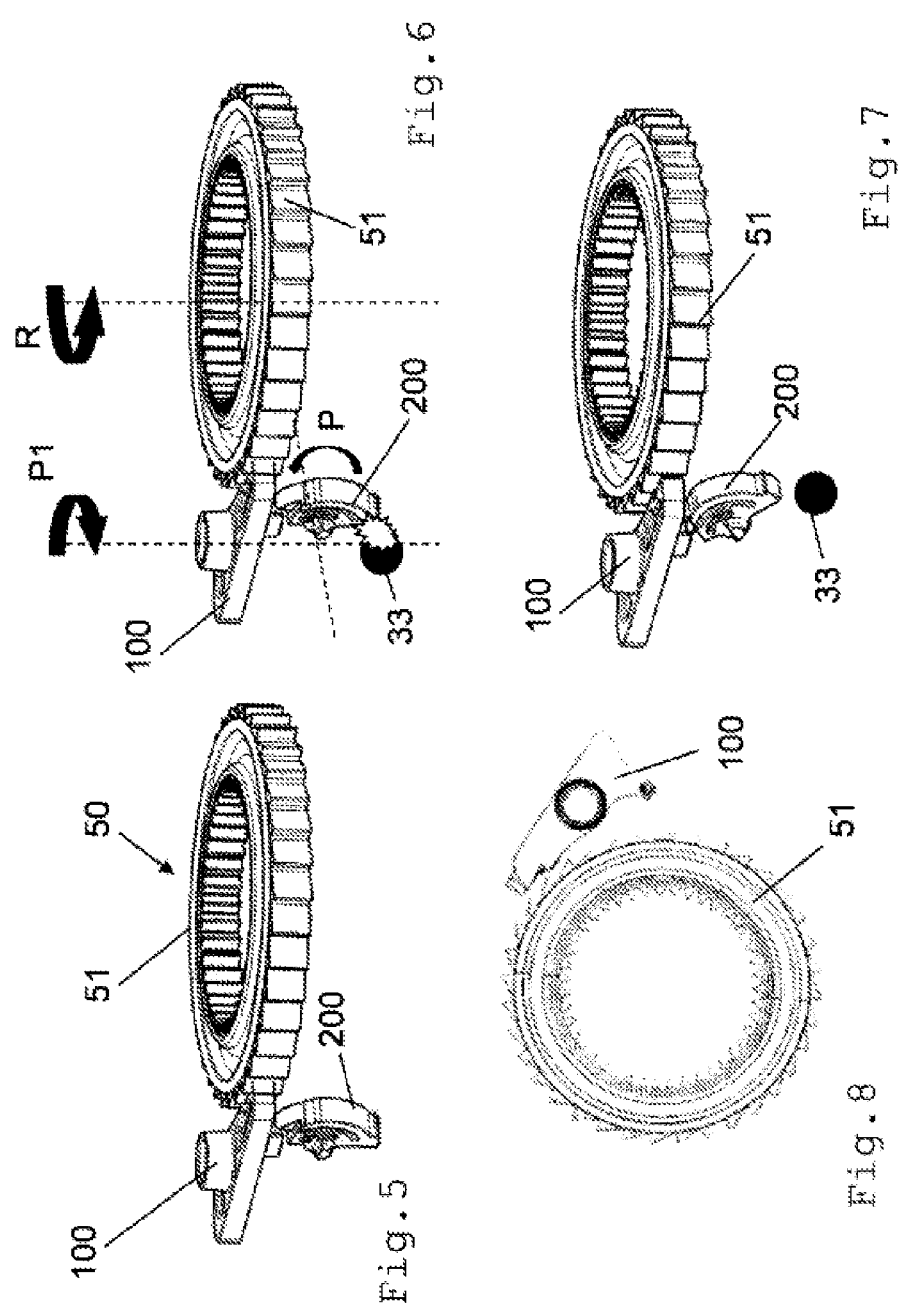

BELT RETRACTOR FOR A SAFETY BELT DEVICE

The invention relates to a belt retractor for a safety belt device having a belt reel for winding and unwinding the safety belt, a pretensioner drive and a pyrotechnic tensioner drive, wherein the pretensioner drive has a force flow control element which in a deactivation position interrupts the force flow between the pretensioner drive and belt reel.

Such a belt retractor is known from the German Offenlegungsschrift DE 10 2004 027 135 A1.

An object of the invention is to provide a belt retractor in which a deactivation of the pretensioner drive during or after activation of the pyrotechnic tensioner drive can be achieved using simple means but in a nonetheless very reliable manner.

This object is achieved according to the invention with a belt retractor having the features according to patent claim 1. Advantageous embodiments of the belt retractor according to the invention are set out in the dependent claims.

Accordingly, there is provision according to the invention for the pyrotechnic tensioner drive to have one or more drive elements which after activation of the pyrotechnic tensioner drive are caused to move and, after an activation of the pyrotechnic tensioner drive, the force flow control element is directly or indirectly moved into the deactivation position by the drive element or—in the case of a plurality of drive elements—by at least one of the drive elements of the pyrotechnic tensioner drive.

A significant advantage of the belt retractor according to the invention can be seen in that the deactivation of the force flow between the pretensioner drive and the belt reel is carried out by means of a force flow control element which is driven or displaced directly or indirectly by one of the drive elements of the pyrotechnic tensioner drive. As a result of the cooperation between the force flow control element and pyrotechnic tensioner drive, it is ensured that the force flow control element is reliably displaced after activation of the pyrotechnic tensioner drive.

In a preferred embodiment, there is provision for the drive element to act directly on the force flow control element and for the force flow control element to be moved into the deactivation position as a result of the direct action of the drive element.

In another preferred embodiment, there is provision for the drive element to act indirectly via at least one intermediate element on the force flow control element and for the force flow control element to be moved into the deactivation position as a result of the action of the drive element on the at least one intermediate element and the resultant action of the at least one intermediate element on the force flow control element.

The force flow control element is preferably a pivotable detent which in a first pivot position assumes an activation position, in which it enables a force flow between the pretensioner drive and the belt reel and, in a second pivot position, assumes the deactivation position.

The drive element can act directly on the pivotable detent and the pivotable detent can be moved into the deactivation position as a result of the direct action of the drive element.

Alternatively, there may be provision for the drive element to act indirectly via at least one intermediate element on the pivotable detent and for the pivotable detent to be moved into the deactivation position as a result of the action of the drive element on the at least one intermediate element and the action of the at least one intermediate element on the pivotable detent.

It is advantageous in the last embodiment mentioned for there to be arranged between the drive element and the force flow control element as an intermediate element a rotation element which is rotated when the drive element is moved past, and for the pivotable detent to be moved by the rotation of the rotation element into the deactivation position.

The rotation element preferably has a stop portion on which the drive element—when it is moved in the pushing direction thereof—acts on the rotation element and pivots it.

It is also advantageous for the rotation element to have an edge portion, in particular a deformable edge portion, which is located before the pyrotechnic tensioner drive is actuated—when viewed in the pushing direction of the drive element—downstream of the stop portion. Such a deformable edge portion may advantageously be used to absorb kinetic impact energy of the drive element which is striking the rotation element by means of deformation and to prevent destruction or serious damage of the rotary bearing of the rotation element as a result of the impact of the drive element.

In a particularly advantageous embodiment, a slot is arranged between the rotation axis of the rotation element and the deformable edge portion of the rotation element. The abovementioned deformability of the deformable edge portion is based on or can at least also be based on the fact that the deformable edge portion can be pressed in the direction of the slot in the event of external action of force with the slot width being reduced.

The slot and the deformable edge portion are preferably each curved and extend in each case in a curved manner around the rotation axis of the rotation element. Such an embodiment is particularly advantageous with respect to the absorption of kinetic impact energy of the drive element striking the rotation element.

When the drive element strikes the rotation element, the edge portion is preferably pressed on a boundary portion of the belt retractor. If the boundary portion is constructed in a yielding manner, an energy absorption is carried out substantially by the edge portion alone; if the boundary portion itself is constructed in a yielding manner, it, or it together with the edge portion, can absorb energy.

The slot width of the slot is, when the deformable edge portion is pressed onto the boundary portion of the belt retractor, preferably at least locally reduced; this enables absorption of kinetic energy by the rotation element in a particularly simple manner.

The edge portion is preferably arranged in such a manner that, in the initial state before activation of the pyrotechnic tensioner drive, it is opposite a boundary portion of the belt retractor or is in abutment therewith.

A rotary bearing which supports the rotation element preferably has a bearing play which enables an at least slight radial movement of the rotary bearing when striking the drive element; such a bearing play improves the energy absorption by the edge portion and/or the boundary portion.

In a particularly preferred embodiment, there is provision, when the drive element strikes the rotation element, for the rotation element to be moved radially as a result of the bearing play and, as a result of the radial movement, for the rotation element to be pressed against the boundary portion of the belt retractor, whereby the edge portion of the rotation element and/or the boundary portion is deformed.

The rotation element preferably further has an introduction portion, in particular an introduction ramp, which extends at the side of the rotation element opposite the stop portion radially outward and when the rotation element is rotated displaces, in particular pivots, the force flow control element.

There is preferably arranged between the rotation axis of the rotation element and the outer edge of the rotation element, in particular between the rotation axis of the rotation element and the deformable edge portion, at least one convex protrusion which extends outward along the rotation axis and which in the starting position of the rotation element before the pyrotechnic tensioner drive is activated and before the rotation element is rotated abuts a portion of the belt retractor, in particular the rotary bearing of the belt retractor, and retains the rotation position of the rotation element by means of a non-positive-locking and/or positive-locking action.

There may be arranged between the rotation axis of the rotation element and the outer edge of the rotation element, in particular between the rotation axis of the rotation element and the deformable edge portion—as an alternative to the already-mentioned convex protrusion or in addition thereto—at least one convex protrusion which extends outward along the rotation axis and both in the starting position before activation of the pyrotechnic tensioner drive and in the end position of the rotation element after activation of the pyrotechnic tensioner drive and after rotation of the rotation element abuts a portion of the belt retractor, in particular of the rotary bearing of the belt retractor, and retains the rotation position of the rotation element by means of a nonpositive-locking and/or positive-locking action.

A bearing portion of the rotation element is—in a plan view along the rotation axis—preferably delimited by a circle chord; such an embodiment can facilitate the assembly of the rotation element.

With regard to simple assembly, it is further considered to be advantageous for a rotary bearing which supports the rotation element to have at least one introduction slot, in particular two aligned introduction slots at diametrically opposing sides, which enables the rotation element to be mounted by means of lateral insertion, with respect to the rotation axis of the rotary bearing radially from the outer side.

The pyrotechnic tensioner drive may have a large number of drive elements. After an activation of the pyrotechnic tensioner drive, the force flow control element may be moved into the deactivation position, for example, by the first drive element when viewed in the pushing direction.

Alternatively, there may be provision for the pyrotechnic tensioner drive as a drive element to have a large number of mass members and a pushing piston, which is arranged between a gas generator and the mass members and which after an activation of the pyrotechnic tensioner drive drives the mass members located in front of it; after an activation of the pyrotechnic tensioner drive, the force flow control element may be moved into the deactivation position, for example, by the pushing piston.

The pyrotechnic tensioner drive may in particular be a ball tensioner having a large number of drive balls which each form a drive element. The force flow control element is with such an embodiment preferably moved by at least one of the drive balls into the deactivation position.

The force flow control element is preferably a pivotable detent which in a first pivot position blocks a rotation movement of a ring gear of a planet gear mechanism and thereby enables a force flow between the pretensioner drive and belt reel and, in a second pivot position which forms the deactivation position, releases the rotation movement of the ring gear of the planet gear mechanism and thereby interrupts the force flow between the pretensioner drive and belt reel.

It is further particularly advantageous for the force flow control element and/or (if present) the intermediate element when viewed in the pushing direction of the drive elements to be arranged downstream of the drive wheel. Such an arrangement ensures that the drive elements, in particular the first drive element when viewed in the pushing direction, first drive the drive wheel and perform their drive function before they meet or can meet the force flow control element or intermediate element. A specific time sequence is consequently predetermined, that is to say, in that the drive wheel is first driven before the force flow control element is moved into the deactivation position thereof and the force flow between the pretensioner drive and the belt reel is interrupted.

The force flow control element and/or the intermediate element are, for example, arranged between the drive wheel and a receiver container, which receives the drive elements after passing the drive wheel, or within such a receiving container.

The invention further relates to a method for operating a belt retractor for a safety belt device which is provided with a belt reel for winding and unwinding the safety belt, a pretensioner drive and a pyrotechnic tensioner drive, wherein in the method after the ignition of the pyrotechnic tensioner drive the pretensioner drive is deactivated by the force flow between the pretensioner drive and the belt reel being interrupted by means of a force flow control element.

According to the invention, with respect to such a method there is provision for the pyrotechnic tensioner drive to have one or more drive elements which after activation of the pyrotechnic tensioner drive are caused to move and, after an activation of the pyrotechnic tensioner drive, for the force flow control element to be moved into the deactivation position indirectly or directly by the drive element or—in the case of a plurality of drive elements—by at least one of the drive elements of the pyrotechnic tensioner drive.

With regard to the advantages of the method according to the invention, reference may be made to the above statements in connection with the belt retractor according to the invention.

Figure 14:
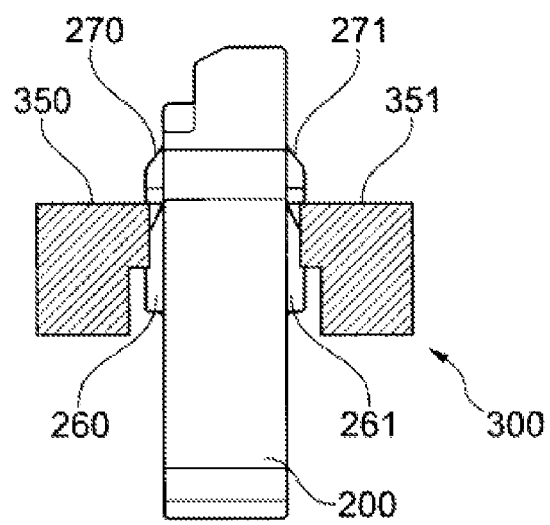
Figure 15:
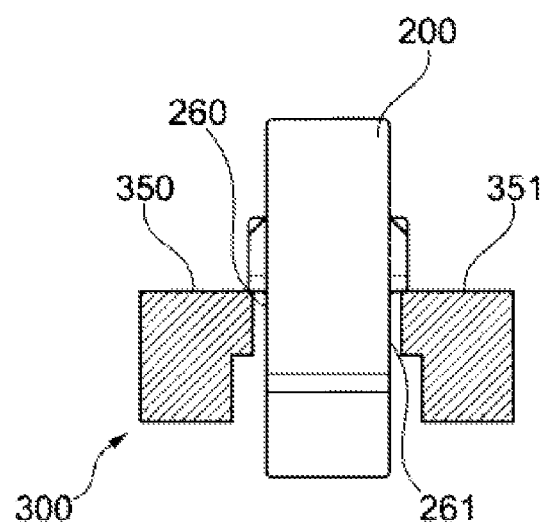
Figure 16:
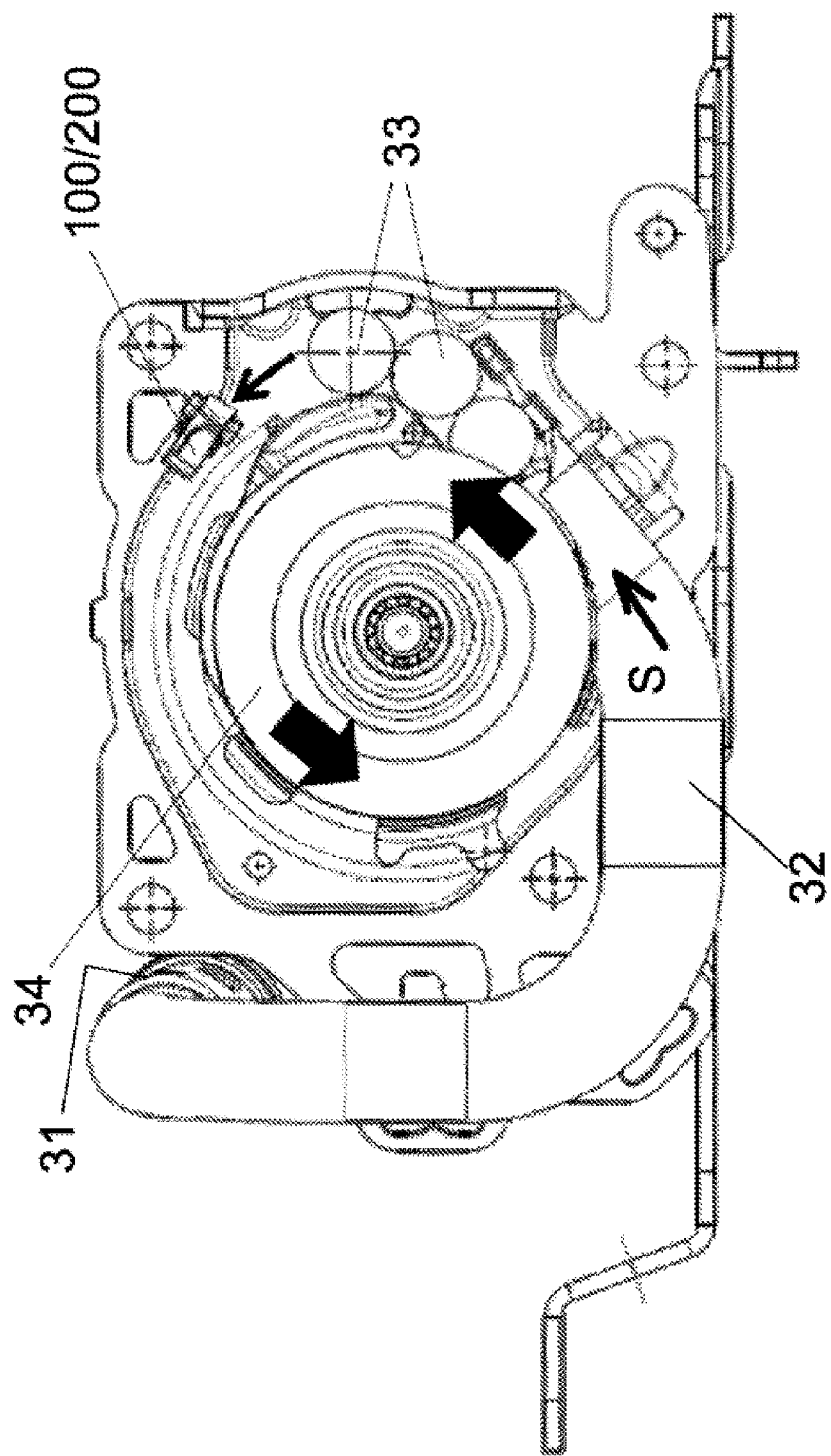

The invention is explained in greater detail below with reference to embodiments; in the drawings by way of example:

FIG. 1 is a three-dimensional exploded illustration of components of an embodiment of a belt retractor according to the invention, in which a force flow control element in a deactivation position can interrupt the force flow between a pretensioner drive of the belt retractor and the belt reel, FIGS. 2-4 show a construction variant of a belt retractor according to FIG. 1, in which the force flow control element is directly displaced by a drive element of a pyrotechnic tensioner drive of the belt retractor, FIGS. 5-15 show a construction variant of a belt retractor in which a force flow control element is displaced indirectly via an intermediate element by one of the drive elements of the pyrotechnic tensioner drive, and FIG. 16 shows a preferred arrangement of the force flow control element and the—if present—intermediate element when viewed in the pushing direction of the drive elements.

In the Figures, for the sake of clarity, the same reference numerals are always used for identical or comparable components.

FIG. 1 shows a belt retractor 10 which inter alia comprises a belt reel 20, a pyrotechnic tensioner drive 30 and a pretensioner drive 40. The pretensioner drive 40 is connected to the belt reel 20, for example, by means of a planet gear mechanism 50. In order to deactivate the force flow between the pretensioner drive 40 and the belt reel 20, there is provided a force flow control element 100 which in a deactivation position can interrupt the force flow.

FIG. 1 further shows by way of example the structure of the pyrotechnic tensioner drive 30 in greater detail. It is possible to see a gas generator 31 having a supply pipe 32 in which drive elements 33 in the form of drive balls are guided. If the gas generator 31 is activated, the gas pressure thereof presses the drive elements 33 through the supply pipe 32 against a drive wheel 34 which is caused to rotate, drives the belt reel 20 and thereby brings about a tensioning of the safety belt.

The function of the force flow control element 100 involves interrupting the force flow between the pretensioner drive 40 and the belt reel 20 as soon as the pyrotechnic tensioner drive 30 is activated. In connection with FIGS. 2 to 15, different construction variants are set out below and enable a deactivation of the force flow between the pretensioner drive 40 and belt reel 20 by means of a force flow control element 100 in a particularly simple and consequently advantageous manner.

FIG. 2 shows a force flow control element 100 in the form of a pivotable detent which is connected to a ring gear 51 of the planet gear mechanism 50. In the pivot position of the pivotable detent 100 shown in FIG. 2, the rotation of the ring gear 51 is blocked so that a force flow or a force transmission between the pretensioner drive 40 and the belt reel 20 according to FIG. 1 is enabled.

The pivotable detent 100 comprises a stop portion 101 which protrudes into the region of the supply pipe 32 or is arranged at the end of the supply pipe 32 and which—after an actuation of the gas generator 31 of the pyrotechnic tensioner drive 30—one of the drive elements 33 strikes and thereby moves so that the pivotable detent 100 is pivoted.

FIG. 3 shows the pivotable detent 100 after one of the drive elements 33 has struck the stop portion 101 and brought about a pivoting of the pivotable detent 100 away from the ring gear 51 of the planet gear mechanism 50. As a result of the pivoting away of the pivotable detent 100 in the direction of the arrow P1, the ring gear 51 of the planet gear mechanism 50 can subsequently rotate freely, as indicated by an arrow with the reference numeral R so that a force transmission between the pretensioner drive 40 and the belt reel 20 is interrupted.

FIG. 4 again shows as a different view the ring gear 51 of the planet gear mechanism 50 and the pivotable detent 100 after it has been pivoted into the deactivation position thereof.

FIG. 5 shows another construction variant in which a force flow control element 100 is formed by a pivotable detent. The pivotable detent 100 is—in contrast to the embodiment according to FIGS. 2 to 4—not redirected directly by one of the drive elements 33 of the pyrotechnic tensioner drive 30 according to FIG. 1, but instead after an actuation of the pyrotechnic tensioner drive 30 indirectly by means of an intermediate element in the form of a rotation element 200.

FIG. 5 shows the rotation element 200 and the pivotable detent 100 in their position before activation of the pyrotechnic tensioner drive 30, that is to say, in a position in which the ring gear 51 of the planet gear mechanism 50 is blocked and a force transmission between the pretensioner drive 40 and the belt reel 20 is possible.

FIG. 6 shows one of the drive elements 33 of the pyrotechnic tensioner drive 30 striking the rotation element 200. It can be seen that the rotation element 200 is rotated in the arrow direction P, whereby it is pivoted in the direction of the pivotable detent 100 and moves the detent 100. It can thus be seen in FIG. 6 that, as a result of the rotation of the rotation element 200 in the arrow direction P, the pivotable detent 100 is pivoted in the arrow direction P1 away from the ring gear 51 of the planet gear mechanism 50, whereby the pivotable detent 100 loses its engagement in the ring gear 51. The ring gear 51 is subsequently freely rotatable so that the force flow between the pretensioner drive 40 and the belt reel 20 is interrupted.

FIG. 7 shows the arrangement of the rotation element 200 and the pivotable detent 100 after the drive element 33 has been passed. It can be seen that the rotation element 200 has pivoted the pivotable detent 100 and it is separated from the ring gear 51.

FIG. 8 shows the arrangement, again as a plan view, between the pivotable detent 100 and the ring gear 51 after the pivotable detent has reached its deactivation position.

In connection with FIGS. 9 to 14, preferred construction variants for the rotation element 200 according to FIGS. 5 to 8 are set out below.

Figure 9:
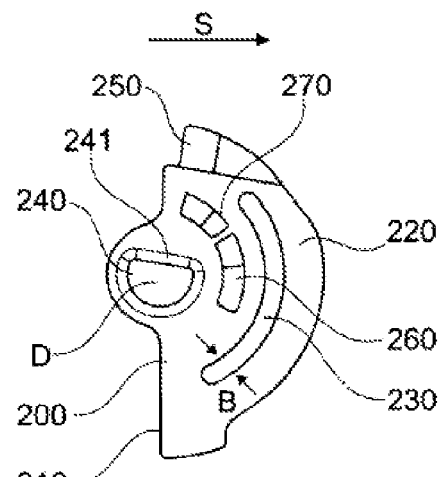

FIG. 9 shows an embodiment of a rotation element 200 which has a stop portion 210. The stop portion 210 is struck by one of the drive elements 33 according to FIG. 1 as soon as the pyrotechnic tensioner drive 30 is actuated.

FIG. 9 further shows a deformable edge portion 220 which is separated by a slot 230 from a rotation axis D of the rotation element 200 or from a bearing portion 240 of the rotation element 200 which forms the rotation axis D. It can be seen that the deformable edge portion 220 and the slot 230 are each curved and in each case extend in a curved manner around the rotation axis D of the rotation element 200.

As will be explained in greater detail below, the deformability of the deformable edge portion 220 may be based on the material thereof (that is to say, a soft material or material portion) and/or on the slot 230 which enables a deformation or a pressing-in or bending-in of the edge portion 220 into the slot 230. In specific terms, it is possible to deform the deformable edge portion 220 radially from the outer side in the direction of the rotation axis D into the slot 230 and in this instance at least locally to reduce the slot width B of the slot 230.

FIG. 9 further shows an introduction ramp 250 which at the side of the rotation element 200 opposite the stop portion 210 extends radially outward and, when the rotation element 200 is rotated, displaces or pivots the force flow control element or the pivotable detent 100 according to FIGS. 5 to 8.

The introduction ramp 250 and the stop portion 210 are preferably separated from each other by the bearing portion 240 of the rotation element 200.

FIG. 9 further shows a convex protrusion 260 and a convex protrusion 270.

The convex protrusion 260 is preferably arranged between the rotation axis D of the rotation element 200 and the deformable edge portion 220 of the rotation element. The convex protrusion 260 extends along the rotation axis D radially outward—in the illustration according to FIG. 9, therefore, forward out of the image plane—and has the function, both before activation of the pyrotechnic tensioner drive 30, that is to say, in the starting position of the rotation element 200, and in the end position of the rotation element 200 after activation of the pyrotechnic tensioner drive 30 and after a rotation of the rotation element 200, of abutting a portion, preferably a portion of a rotary bearing which supports or retains the rotation element 200, and retaining the desired rotation position of the rotation element 200 before and after activation of the pyrotechnic tensioner drive 30 by means of a non-positive-locking and/or positive-locking action.

The convex protrusion 270 is preferably also arranged between the rotation axis D and the deformable edge portion 220 of the rotation element 200 and also extends along the rotation axis D in an outward direction—that is to say, in the illustration according to FIG. 9 out of the image plane in an upward direction. The function of the convex protrusion 270 involves, in the starting position of the rotation element 200 before activation of the pyrotechnic tensioner drive 30 and before rotation of the rotation element 200, abutting a portion, for example, a bearing portion, of a rotary bearing which is supporting the rotation element 200 and retaining the desired rotation position of the rotation element 200 before activation of the pyrotechnic tensioner drive 30 by means of a non-positive-locking and/or positive-locking action.

In FIG. 9, it can further be seen that the bearing portion 240 of the rotation element 200—when viewed in a plan view along the rotation axis D—is delimited by a circle chord 241. The shaping of the bearing portion 240 with the circle chord 241 enables particularly simple introduction of the rotation element 200 into a rotary bearing which retains the rotation element 200, as is intended be explained in greater detail below in connection with FIGS. 10 to 12.

Figure 10:
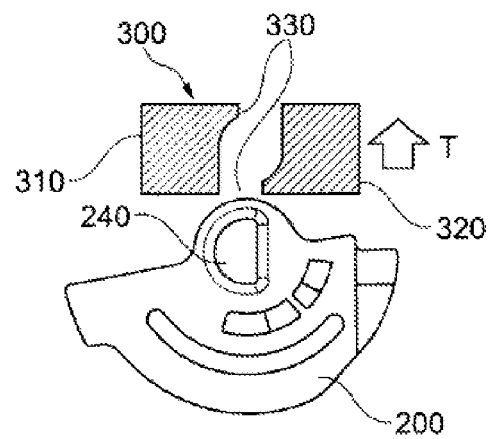

FIG. 10 shows the rotation element 200 according to FIG. 9 before it is inserted in the arrow direction T into a rotary bearing 300. The rotary bearing 300 has two part-portions, that is to say, a front part-portion 310 when viewed in the pushing direction S of the drive elements 33 in the supply pipe 32 according to FIG. 1 and a rear part-portion 320 when viewed in the pushing direction S. The two part-portions 310 and 320 are separated from each other by two diametrically opposed introduction slots 330.

Figure 11:
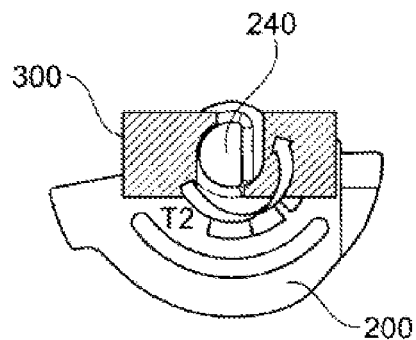

The introduction slots 330 enable the bearing portion 240 of the rotation element 200 to be pushed in in the arrow direction T, as shown in greater detail in FIGS. 10 and 11. As soon as the bearing portion 240 is inserted into the region between the two part-portions 310 and 320, the rotation element 200 can be rotated in the arrow direction T2, whereby it reaches its starting position, that is to say, the position thereof prior to activation of the pyrotechnic tensioner drive 30 and prior to deactivation of the force flow between the tensioner drive 40 and the belt reel 20.

Figure 12:
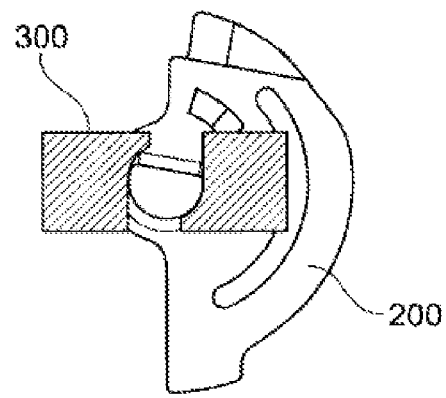

FIG. 12 shows the rotation element 200 after it has been introduced into the rotary bearing 300 and rotated into the starting position.

In the starting position, the rotation element 200 preferably has a degree of bearing play within the rotary bearing 300, whereby it is possible for the rotation element 200 to carry out at least a slight radial movement within the rotary bearing 300 when one of the drive elements 33 of the pyrotechnic tensioner drive 30 strikes.

Figure 13:
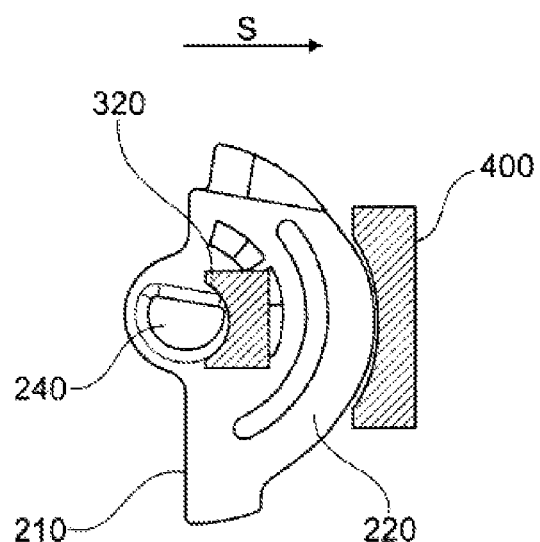

FIG. 13 shows the rotation element 200, the rear part-portion 320 of the rotary bearing 300 when viewed in the pushing direction S and in addition a boundary portion 400. The boundary portion 400 is located—in the starting state before activation of the pyrotechnic tensioner drive 30—opposite the deformable edge portion 220 or abuts it directly.

If, after the activation of the pyrotechnic tensioner drive 30, one of the drive elements 33 strikes the stop portion 210 of the rotation element 200, the rotation element 200 can as a result of the degree of bearing play within the bearing 300 move in the pushing direction S. As a result of this radial movement of the rotation element 200, the deformable edge portion 220 of the rotation element 200 is pressed against the boundary portion 400, whereby the edge portion 220 of the rotation element 200 and/or the boundary portion 400 is deformed and kinetic energy of the striking drive element 33 is consumed by means of deformation. As a result of the deformation of the deformable edge portion 220 and/or the boundary portion 400, the bearing portion 240 of the rotation element 200 is mechanically relieved, whereby a destruction of the bearing portion 240 is reliably prevented.

The boundary portion 400 further acts as a stop for the stop portion 210 of the rotation element 200 after it has been rotated into the end position.

FIG. 14 shows the rotary bearing 300 and the rotation element 200 which has been introduced therein in the starting position prior to a deactivation of the pyrotechnic tensioner drive 30 or prior to a rotation. It is possible to see the already-mentioned convex protrusions 260 and 270 on one side of the rotation element 200 and corresponding convex protrusions 261 and 271 at the opposite side of the rotation element 200. The function of the two convex protrusions 260 and 261 involves determining the rotation position of the rotation element 200 before activation of the pyrotechnic tensioner drive 30 and preventing rotation of the rotation element 200 which is unintentional or which is not brought about by activation of the tensioner drive.

FIG. 15 shows the rotation element 200 in the rotary bearing 300 after a rotation or after the activation of the pyrotechnic tensioner drive 30 and after the end position has been reached. It can be seen that the end position of the rotation element 200 is retained by the convex protrusions 260 and 261 which are supported by means of a non-positive-locking and/or positive-locking action on the portions 350 and 351 of the rotary bearing 300.

FIG. 16 shows a preferred arrangement of the force flow control element 100 and—if present—of the intermediate element (see, for example, the above-described rotation element 200) in the pushing direction S of the drive elements 33. It can be seen that the force flow control element 100 and the rotation element 200 (if present) are preferably arranged when viewed in the pushing direction S downstream of the drive wheel 34; this arrangement advantageously leads to the drive elements 33, in particular the first drive element 33 when viewed in the pushing direction S, first driving the drive wheel 34 and performing the driving function thereof before they strike or can strike the force flow control element 100 and the rotation element 200; it is thereby advantageously possible for the drive wheel 34 to be driven before the force flow control element 100 is moved into the deactivation position thereof and the force flow between the pretensioner drive 40 and the belt reel 20 is finally interrupted.

Although the invention has been illustrated and described in detail by preferred embodiments, the invention is not limited by the disclosed examples and other variations can be derived therefrom by the person skilled in the art without departing from the protective scope of the invention.

LIST OF REFERENCE NUMERALS

10 Belt retractor
20 Belt reel
30 Pyrotechnic tensioner drive
31 Gas generator
32 Supply pipe 33 Drive element
34 Drive wheel
40 Pretensioner drive
50 Planet gear mechanism
51 Ring gear
100 Force flow control element/pivotable detent
101 Stop portion
200 Rotation element
210 Stop portion
220 Deformable edge portion
230 Slot
240 Bearing portion
241 Circle chord
250 Introduction ramp
260 Convex protrusion
261 Convex protrusion
270 Convex protrusion
271 Convex protrusion
300 Rotary bearing
310 Front part-portion
320 Rear part-portion
330 Introduction slot
350 Portion
351 Portion
400 Boundary portion
B Slot width
D Rotation axis
P Arrow direction
P1 Arrow direction
R Arrow
T Arrow direction
T2 Arrow direction
S Pushing direction

The invention claimed is:

1. A belt retractor (10) for a safety belt device having a belt reel (20) for winding and unwinding the safety belt, a pretensioner drive (40) and a pyrotechnic tensioner drive (30), wherein the pretensioner drive (40) has a force flow control element (100) which in a deactivation position interrupts the force flow between the pretensioner drive (40) and belt reel (20), wherein
the pyrotechnic tensioner drive (30) has one or more drive elements (33) which after activation of the pyrotechnic tensioner drive (30) are caused to move and,
the pyrotechnic tensioner drive (30) is a ball tensioner having a large number of drive balls which each form a drive element (33),
after an activation of the pyrotechnic tensioner drive (30), the force flow control element (100) is directly or indirectly moved into the deactivation position by the drive element (33) or by at least one of the drive elements (33) of the pyrotechnic tensioner drive (30), and
the force flow control element (100) is moved into the deactivation position by at least one of the drive balls.

2. The belt retractor (10) as claimed in claim 1, wherein
the drive element (33) acts indirectly via at least one intermediate element on the force flow control element (100) and
the force flow control element (100) is moved into the deactivation position as a result of the action of the drive element (33) on the at least one intermediate element and the resultant action of the at least one intermediate element on the force flow control element (100).

3. The belt retractor (10) as claimed in claim 1, wherein the force flow control element (100) is a pivotable detent which in a first pivot position assumes an activation position, in which it enables a force flow between the pretensioner drive (40) and the belt reel (20) and, in a second pivot position, assumes the deactivation position.

4. The belt retractor (10) as claimed in claim 3, wherein the drive element (33) acts directly on the pivotable detent and the pivotable detent is moved into the deactivation position as a result of the direct action of the drive element (33).

5. The belt retractor (10) as claimed in claim 3, wherein
the drive element (33) acts indirectly via at least one intermediate element on the pivotable detent and
the pivotable detent is moved into the deactivation position as a result of the action of the drive element (33) on the at least one intermediate element and the action of the at least one intermediate element on the pivotable detent.

6. The belt retractor (10) as claimed in claim 3, wherein
there is arranged between the drive element (33) and the force flow control element (100) as an intermediate element a rotation element (200) which is rotated when the drive element (33) is moved past, and
the pivotable detent is moved by the rotation of the rotation element (200) into the deactivation position.

7. The belt retractor (10) as claimed in claim 6, wherein
the rotation element (200) has a stop portion (210) on which the drive element (33)—when it is moved in the pushing direction (S) thereof—acts on the rotation element (200) and pivots it, and
the rotation element (200) has an edge portion (220), in particular a deformable edge portion (220), which is located before the pyrotechnic tensioner drive (30) is actuated—when viewed in the pushing direction (S) of the drive element (33)—downstream of the stop portion (210).

8. The belt retractor (10) as claimed in claim 7, wherein
a slot (230) is arranged between the rotation axis (D) of the rotation element (200) and the deformable edge portion (220) of the rotation element (200), and
the deformability of the deformable edge portion (220) is based on or at least also based on the fact that the deformable edge portion (220) can be pressed in the direction of the slot (230) in the event of external action of force with the slot width being reduced.

9. The belt retractor (10) as claimed in claim 8, wherein, when the drive element (33) strikes the rotation element (200), the edge portion (220) is pressed on a boundary portion (400) of the belt retractor (10).

10. The belt roller (10) as claimed in claim 6, wherein
the edge portion (220) in the initial state before activation of the pyrotechnic tensioner drive (30) is opposite a boundary portion (400) of the belt retractor (10) or is in abutment therewith, and
a rotary bearing (300) which supports the rotation element (200) has a bearing play which enables an at least slight radial movement of the rotary bearing (300) when striking the drive element (33).

11. The belt retractor (10) as claimed in claim 10, characterized in that wherein,
when the drive element (33) strikes the rotation element (200), the rotation element (200) is moved radially as a result of the bearing play and,
as a result of the radial movement, the rotation element (200) is pressed against the boundary portion (400) of the belt retractor (10), whereby the edge portion (220) of the rotation element (200) and/or the boundary portion (400) is deformed.

12. The belt retractor (10) as claimed in claim 1, wherein the force flow control element (100) and/or an intermediate rotation element (200) when viewed in the pushing direction (S) of the drive elements is arranged downstream of a drive wheel (34).

13. A belt retractor (10) for a safety belt device having a belt reel (20) for winding and unwinding the safety belt, a pretensioner drive (40) and a pyrotechnic tensioner drive (30), wherein the pretensioner drive (40) has a force flow control element (100) which in a deactivation position interrupts the force flow between the pretensioner drive (40) and belt reel (20), wherein
    the pyrotechnic tensioner drive (30) has one or more drive elements (33) which after activation of the pyrotechnic tensioner drive (30) are caused to move and,
    after an activation of the pyrotechnic tensioner drive (30), the force flow control element (100) is directly or indirectly moved into the deactivation position by the drive element (33) or by at least one of the drive elements (33) of the pyrotechnic tensioner drive (30), and
    wherein the drive element (33) acts directly on the force flow control element (100) and the force flow control element (100) is moved into the deactivation position as a result of the direct action of the drive element (33).

* * * * *